March 15, 1966   H. S. CANNON ET AL   3,240,414
FORGE ROLLS FOR FUSION WELDING OF ALUMINUM
Filed Aug. 22, 1962
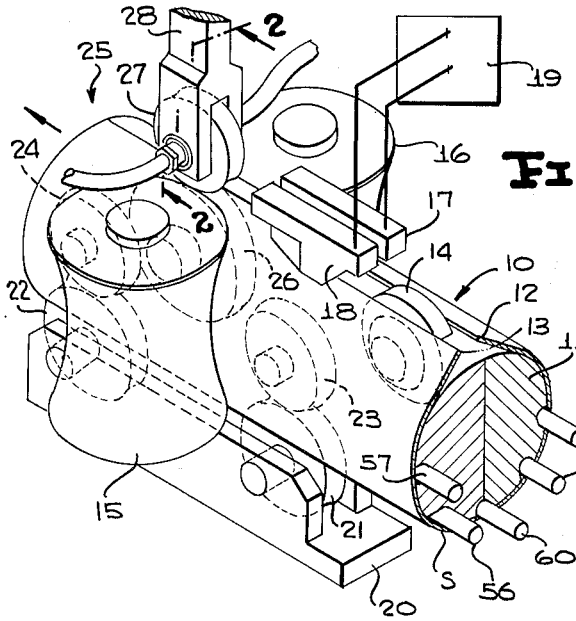
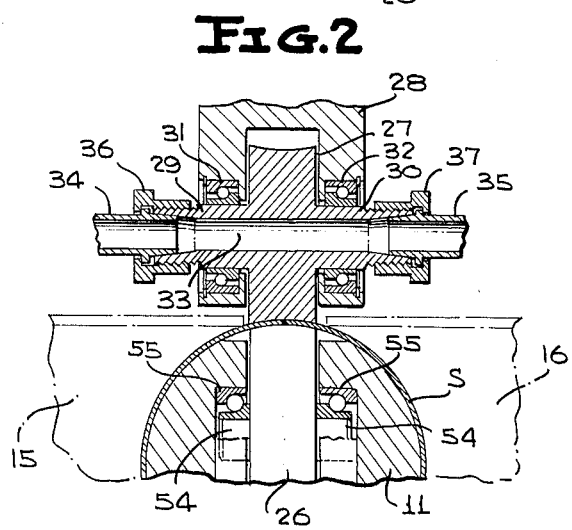
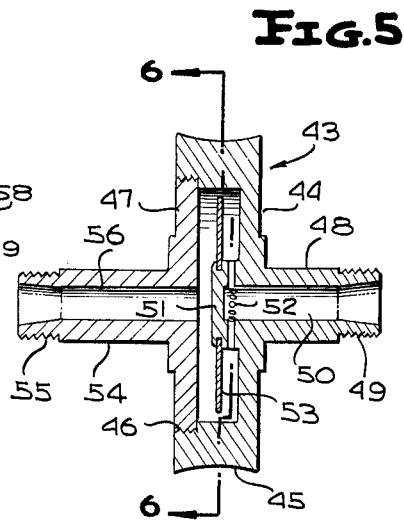
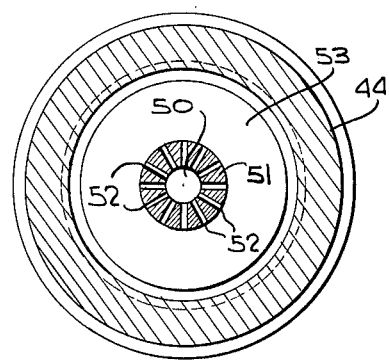
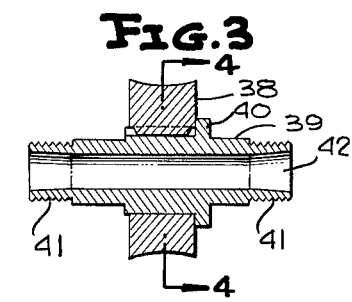
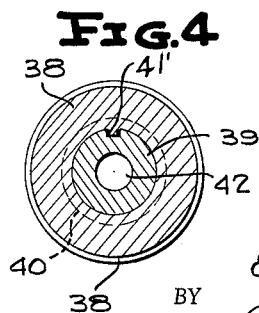
INVENTORS
HOWARD S. CANNON,
PHILIP F. CATALANO
& ROGER M. O'NEILL
BY
Mason, Porter, Diller & Stewart
ATTORNEYS United States Patent Office 3,240,414
Patented Mar. 15, 1966

3,240,414
FORGE ROLLS FOR FUSION WELDING
OF ALUMINUM
Howard S. Cannon, Evergreen Park, Philip F. Catalano, Chicago, and Roger M. O'Neill, Oak Lawn, Ill., assignors to Continental Can Company, Inc., New York, N.Y., a corporation of New York
Filed Aug. 22, 1962, Ser. No. 218,747
18 Claims. (Cl. 228—44)

This invention relates in general to new and useful improvements in the fusion welding of metals, and more particularly relates to novel forge rolls for the fusion welding of aluminum.

This invention particularly pertains to the formation of a fusion weld joining sheets or strips of aluminum or in the joining of two edges of a single strip to form a tube. In accordance with the general proposition of this invention, edge portions of two sheets or two edges of a single sheet in the forming of a tube are brought into slight overlapping relation and immediately prior to the bringing together of the overlapped edge portions of the sheet material, the overlapped edge portions are heated to a fusion welding temperature. The overlapped edge portions of the sheet material are immediately thereafter passed between two forge rolls which simultaneously forge together the overlapped edge portions and effect a squeezing out or rolling of the overlapped edge portions so that the double thickness of the sheet material along the general line of overlap is reduced to substantially a single thickness of the sheet material. When pressure is applied on the overlapped edge portions, due to the combination of the high heat of the edge portions and the pressure, bonding occurs between the fused or partially fused overlapped edge portions.

The existence of liquid aluminum and other aluminum which is at a temperature in the vicinity of or above the liquification temperature results in a serious problem of metal pick-up on the forge rolls. It is readily apparent that once a forge roll picks up any aluminum from the molten edges of sheet material passing therebeneath, this solidifies and then picks up more aluminum so that there is a continuous build up of the aluminum on the forge roll with the result that the welding operation must be almost immediately discontinued. It is therefore necessary to provide suitable means for effecting the forge rolling of the overlapped edge portions of the sheet material being fusion welded which will permit the application of the required forging pressure to the sheet material and at the same time prevent metal pick-up. This is the primary object of this invention.

Welding of relatively thick aluminum has been accomplished in the past in a manner which is satisfactory for some purposes. However, the requirements of a welded seam for use in the manufacture of can bodies are much more rigid than those in other fields of endeavor and the metal sheet being welded is much thinner than that used for most other welded structures. In the formation of aluminum can bodies, not only is it necessary that the seams be leak-free, but it is also necessary that the length of tubing from which the can body is to be formed, be capable of being flanged and a seam formed between opposite ends of the resulting can body and can end in the customary manner. Although great efforts have been made in the past to weld successfully thin aluminum and aluminum alloy sheet material to form tubes which are later separated into individual can body lengths, in the past a maximum reliability of 90% was the best obtainable. While such a reliability will be suitable in some fields, a 90% reliability figure for can bodies could never be commercial.

In the past, metal pick-up by the forge rolls has been prevented by rigidly controlling the temperature of the heated edge portions of the sheet material to be joined so as to prevent the existence of liquid aluminum that may be picked up by the forge rolls. However, if the edge portions of the sheet material are not heated to a sufficiently high temperature within or above the melting range, it is difficult to obtain a reliable weld. The edge portions being fused must be heated to a sufficiently high temperature wherein just prior to the forging operation there is a melting of the aluminum at least along the width of the overlapped edges. Since the aluminum must be heated above its melting point, the liquid aluminum has a thin oxide film formed on it of some 25 to 35 angstrom units thick when welding is carried out at a commercially practical speed. Without "forging" deformation of the liquid aluminum, these oxides would not be disrupted sufficiently to give assurance of bonding all the way through the cross-section of the initially double thickness lap. Therefore, when the temperature of the aluminum and aluminum alloy sheet material is held below a practical working temperature so as to prevent metal pick-up on customary forge rolls, the reliability of the resulting weld is not good. On the other hand, when the edge portions of the sheet material to be fusion welded are sufficiently heated to produce a reliable weld, the problem of metal pick-up on the forging rolls immediately arises.

A forge roll must have other characteristics besides a resistance to metal pick-up in the fusion welding under pressure by a forging operation of aluminum and aluminum alloy sheet materials. The forge roll must be resistant to thermal fatigue or thermal spalling of the surface material thereof. A forge roll is in contact with extremely hot metal surfaces for only a short portion of the angular rotation thereof, with the result that the surface of the forge roll is almost instantaneously heated to a high temperature by contact with the very hot metal, after which it is gradually cooled during the remaining portion of the rotation thereof until it again comes into contact with the hot metal surface being fusion welded.

In addition to the foregoing, a forge roll suitable for the intended purpose must have a hardness and strength sufficient to resist the forces on it at the operating temperature; the forge roll must resist softening at the operating temperature; and the forge roll must be resistant to oxidation unless a protective atmosphere is to be used in the welding operation.

The most apparent metal for use as a forge roll material would be one of the tough ferrous alloys. However, numerous experiments with suitable classes of ferrous alloys, including tool steels, have proved not to be successful. Attempts have been made to provide the ferrous alloys with hard coatings, such as a chromium coating. However, after several minutes of operation, the chromium coating began to show pits. Microscopic observation of the pitted coatings suggested these pits were very probably the result of thermal shock resulting from cyclic heating upon contact with molten aluminum with cooling during the remaining period of rotation of the particular portion of the forge roll to the next time of contact of that portion with liquid aluminum.

In view of the foregoing, it is another object of this invention to provide a novel forge roll for use in the fusion welding of lapped edge portions of aluminum and aluminum alloy sheet material wherein liquid aluminum is present in contact with the forge rolls during the forging operation, and wherein the forge roll is formed of a non-ferrous alloy which is capable of withstanding the working and thermal stresses imposed thereon at the desired operating temperatures and pressures without metal pick-up from the sheet material being fusion welded.

Another object of this invention is to provide a novel forge roll for use in the forge welding of aluminum wherein the forge roll is formed of a non-ferrous alloy and which alloy is capable of being hardened by heat treatment to a Rockwell hardness of C–20 to C–40 wherein the surface of the forge roll is of sufficient hardness to withstand the pressures exerted thereon during a forge rolling operation.

Still another object of this invention is to provide a novel forge roll construction for the forge rolling of aluminum in a forge welding operation wherein liquid aluminum exists and is in contact with the forge roll, the forge roll assembly including means for employing an internal temperature-regulating liquid to the forge roll to provide for an operative surface temperature of the forge roll within the range of 330° F. to 450° F., whereby pick-up of the molten aluminum is non-existant.

A further object of this invention is to provide a novel forge roll for use in the forge rolling of lapped aluminum sheet portions heated to a temperature in the vicinity of or above the melting temperature thereof, the forge roll assembly being intended for use in effecting the bonding of the highly heated aluminum edge portions in an operation wherein molten aluminum comes into contact with the forge roll, the forge roll being formed of a non-ferrous alloy which is heat treatable to a Rockwell hardness of C–20 to C–40, and liquid temperature-regulating means are provided for maintaining the operative surface temperature of the forge roll within the range of 330° F. to 450° F. whereby pick-up of the molten aluminum is non-existant.

A still further object of this invention is to provide a novel method of forge welding lapped edge portions of aluminum and aluminum alloy sheet material wherein the opposed surfaces of the lapped portions of the sheet material are heated to a welding temperature, and wherein molten aluminum is existant for engaging with forge rolls, the method of passing the heated lapped portions between a pair of forge rolls, and directing a heated temperature-regulating liquid through at least one of the forge rolls wherein the operative surface temperature of the one forge roll is maintained within the range of 330° F. to 450° F.

A still further object of this invention is to provide a novel forge roll which is capable of withstanding the working and thermal stresses imposed thereupon at the desired operating temperatures and pressures for welding aluminum sheet material which has been heated to a welding temperature and brought into overlapped relation, the forge roll being capable of coming into contact with liquid aluminum during the forge welding operation without metal pick-up from the liquid aluminum and being suitably formed from a beryllium copper, a titanium alloy, or a nickel base alloy.

With the above and other objects in view that will hereinafter appear, the nature of the invention will be more clearly understood by reference to the following detailed description, the appended claims and the several views illustrated in the accompanying drawing:

In the drawings:

FIGURE 1 is a fragmentary perspective view showing generally the details of welding equipment for welding lapped edge portions of an aluminum tube in accordance with this invention and shows generally the position of the forge rolls which are the subject of this invention.

FIGURE 2 is an enlarged fragmentary transverse sectional view taken along the line 2—2 of FIGURE 1, and shows more specifically the general relationship of the forge rolls and the tube during the forge welding operation.

FIGURE 3 is a transverse sectional view taken through a modified form of forge roll and shows the general construction thereof.

FIGURE 4 is a longitudinal vertical sectional view taken along the line 4—4 of FIGURE 3, and shows in more detail the forge roll of FIGURE 3.

FIGURE 5 is a transverse sectional view taken through still another form of forge roll and shows generally the details thereof.

FIGURE 6 is a longitudinal vertical sectional view taken along the line 6—6 of FIGURE 5, and shows still further the details of the forge roll of FIGURE 5.

Referring now to the drawings in detail, reference is first made to FIGURE 1, wherein there is illustrated a forge welding mechanism, generally referred to by the numeral 10. The forge welding mechanism 10 includes a horn 11 which is illustrated as being of a split construction and about which an aluminum or aluminum alloy strip S is shaped into a generally unseamed tubular form before the welding takes place. Prior to the welding operation, edges 12 and 13 of the strip S are maintained in spaced relation by means of a spacer which is illustrated in the form of a separator wheel 14. The construction of the separator wheel 14, which of itself is not a part of this invention, is such so as to maintain one of the edges 12 and 13 slightly elevated above the other of the edges so that the edges 12 and 13 may be brought into overlapped relation.

A pair of hourglass rolls 15 and 16 are disposed on opposite sides of the horn 11 for the purpose of bringing together the edges 12 and 13 of the strip S into overlapped relation. The hourglass rolls 15 and 16 are spaced downstream of the horn 11 from the separator wheel 14.

The edges 12 and 13 of the strip S may be heated to a fusion welding temperature by means of a pair of electrode shoes 17 and 18 which engage the edge portions of the strip S adjacent the edges 12 and 13, respectively. The electrode shoes 17 and 18 are connected in a conventional manner to a high frequency generator 19 and are in sliding contact with the upper surface of the strip S adjacent the edges 12 and 13 to supply electrical current to the edge portions of the strip S and heat the same in a conventional manner which in itself is not a part of this invention.

A support block 20 underlies the horn 11 and carries a pair of lower support rolls 21 and 22. The support rolls 21 and 22 have concaved surfaces corresponding to the curvature of the strip S after it has been shaped into tubular form and the support rolls 21 and 22 engage the lower portion of the moving strip after it assumes its tubular shape. The horn 11 is provided with a pair of support rolls 23 and 24 which oppose the support rolls 21 and 22, respectively. The support rolls 23 and 24 have a convex surface configuration corresponding to the internal surface of the strip S. The support rolls 21 and 23, as well as the support rolls 22 and 24, are spaced apart to receive the strip S in pressure contact therebetween. In this manner, the downward pressure of the forge roll support 28 on the horn 11 is transferred through the support rolls 23 and 24, through the moving strip S and into the support rolls 21 and 22 so that the horn 11 is supported externally despite the fact that the strip S is shaped thereabout and continuously moves therealong.

In accordance with the known welding operation utilizing the electrode shoes 17 and 18, the overlapped edges 12 and 13 of the strip S are brought into engagement at the apex of a triangle generally defined by the converging edges 12 and 13 of the strip S are brought into engagement at the apex of a triangle generally defined by the converging edges 12 and 13 downstream of the separator wheel 14. The electrode shoes 17 and 18 are so positioned and the current supplied thereby is of such a frequency wherein maximum heating of the edge portions of the strip S is obtained substantially at the point of overlap of the edges 12 and 13. At this point, there is located a forge roll assembly, generally referred to by the numeral 25.

The forge roll assembly 25 includes an internal forge roll 26, which is suitably carried by the horn 11, and an upper forge roll 27. The forge roll 27 is carried by a vertically adjustable support 28. The surface of the forge roll 26 is convex, whereas the surface of the forge roll 27 is of a complementary concave cross-section, with the surface configurations of the forge rolls 26 and 27 corresponding to that of the curvature of the tube into which the strip S is being formed. Accordingly, the forge rolls 26 and 27 may be utilized for simultaneously applying necessary forging pressure to the overlapped edge portions of the strip S and for the reshaping of the overlapped edge portions.

The apparatus thus far described is not of itself a part of this invention, and the welding apparatus 10, as far is is described hereinabove, is suitable for welding certain metals, including low carbon steel and the like. However, when the welding apparatus 10, as described above, is utilized in the welding of aluminum and aluminum alloy strip material, and the edge portions of the strip S are heated to a sufficient temperature to obtain a commercially reliable weld, molten aluminum exists at the weld point and in contact with the forge rolls 26 and 27. The molten aluminum results from heating the edge portions of the strip to a fusion welding temperature, and the forging pressure is exerted on the overlapped liquified edge portions to provide for the reduction of the thickness of the resultant tube along the weld area to a thickness substantially equal to the original thickness of the strip. This molten aluminum has a tendency to adhere to the forge rolls 26 and 27.

Due to the high pressures involved, as well as the high temperatures, it is necessary that the forge rolls be formed of a material which will withstand the working and thermal stresses imposed in the operation of the welding apparatus 10. The obvious materials for forming the forge rolls are ferrous alloys. However, numerous ferrous alloys, including tool steel, have been tried without success. The double thickness of the liquid aluminum or aluminum alloy sheet material coming into lapped edge relation at the forge rolls 26 and 27 is within or above the melting temperature range of the aluminum. As the double thickness of the sheet material is squeezed between the forge rolls 26 and 27, the liquid aluminum between the forge rolls 26 and 27 may be displaced laterally on the surface and pressed into adjacent solid aluminum by the forge rolls, particularly the upper forge roll 27. If the surface of the solid aluminum into which the liquid aluminum is being pressed is too cold, the liquid aluminum will solidify as it is displaced laterally and then when pressed into adjacent solid metal, does not bond into it. On the other hand, it has been found that with ferrous forge rolls, if the surface of the forge roll is too hot, alloying with the forge roll is encountered, at least on a microscale, and there results the difficulty known as "pick-up."

Attempts were made to overcome the pick-up by the forge rolls by applying a chromium layer over the forge roll. However, the chromium plated forge rolls are prone to pick-up, and it was found that after several minutes of operation during welding, the chromium coating began to show pits. Microscopic examination of the pitted coatings suggested these pits were very probably the result of thermal shock resulting from cyclic heating upon contact with molten aluminum with cooling during the remaining period of rotation of the particular element of the forge roll to the next thermal contact of that element with the liquid aluminum. Accordingly, prior to the development of special forge rolls, which are the subject of this invention, aluminum tubing formed in accordance with the foregoing and separated into individual can body lengths could result in the forming of flanged can bodies with only 90% reliability which in no way approaches the practical reliability required for a can body line.

In accordance with this invention, it is proposed to provide a forge roll, such as the forge roll 27, which is formed of a non-ferrous alloy and which is capable of being heat treated to have a surface hardness of a Rockwell hardness of C–30 to C–40 and which has the necessary thermal conductivity to rapidly exchange the heat received therefrom during contact with the liquid aluminum. Non-ferrous alloys which are practical for the formation of forge rolls are beryllium copper, titanium alloys and nickel base alloys, such as aged hardenable nickel, Type K Monel, titanium nickel and beryllium nickel.

It has also been found that if the forge rolls are operated so as to maintain a temperature of the operative surface below about 450° F., there is no pick-up of the liquid aluminum and the forge rolls are less susceptible to damage. On the other hand, surface of the forge rolls must not be too greatly cooled so as to reduce the temperature of the surface below a minimum operating temperature of about 330° F. In this case, the relative cold surface of the forge rolls too quickly chills and solidifies the liquid aluminum with the result that bonding of the laterally displaced metal of the original double thickness lap is imperfect.

As a result, in accordance with this invention, it is proposed to utilize a heated temperature-regulating liquid flowing through the roll wherein the surface temperature of the forge roll brought into contact with the liquid aluminum is maintained within the range of 330° F. to 450° F. with an optimum operating range between 350° F. to 400° F. To obtain such temperatures, a liquid, such as recirculated oil at a temperature in the range of 100° F. to 300° F. is utilized.

Referring now to FIGURE 2 in particular, it will be seen that the forge roll 27 is provided with integral stub shaft portions 29 and 30 which are received in bearings 31 and 32, respectively, carried by the support 28. The forge roll 27 has a central bore 33 therethrough which also extends through the stub shafts 29 and 30. Liquid circulating lines 34 and 35 are connected to the stub shafts 29 and 30 by means of rotary couplings 36 and 37 of a conventional type. Thus, as the forge roll 27 rotates, liquid at the desired temperature is passed through the central portion of the forge roll 27 and serves to maintain the desired operative surface temperature thereof.

Reference is now made to FIGURES 3 and 4 wherein there is illustrated a modified form of forge roll 38. The forge roll 38 is provided with a hollow shaft 39 which includes a retaining flange 40. The forge roll 38 is keyed onto the shaft 39, as at 41', as is best shown in FIGURE 4. The opposite ends of the shaft 39 are threaded, as at 41, for the reception of rotary couplings, such as the rotary couplings 36 and 37 of FIGURE 2. The shaft 39 has a bore 42 therethrough through which the temperature-regulating liquid may pass. The shaft 39 may be formed of the same metal as is the forge roll 38, or it may be formed of a suitable steel. It is to be understood that the diameter of the shaft 39 may be proportionally larger than that shown on the drawing, i.e., shaft 39 may be provided with a larger central or hub portion wherein the portion of the forge roll formed of a non-ferrous alloy may be limited to a rim portion.

Referring now to FIGURE 5 and 6 in particular, it will be seen that there is illustrated a two-piece forge roll, generally referred to by the numeral 43, which may serve as a substitute for the forge roll 27. The forge roll 43 includes a first forge roll portion 44 having a concave workpiece engaging surface 45. The roll portion 44 is of a hollow construction and is provided with internal threads, as at 46. A second roll half 47 is provided with external threads which thread into the roll half 44 and mate with the threads 46 thereof.

The roll half 44 is provided with an integral stub shaft 48 which terminates in an externally threaded end portion 49 for the engagement of a rotary coupling, such as the rotary coupling 37. The stub shaft 48 has a bore 50 extending therethrough with the inner end of the bore being closed by an integral baffle portion 51. A plurality of radial bores 52 of small diameter as compared to the bore 50 extend from the inner end of the bore 50 into the interior of the roll portion 44. A separate baffle plate 53 is carried by the baffle 51 so as to force the flow of temperature-regulating liquid outwardly into engagement with the outer portion of the roll portion 44.

The roll portion 47 has a stub shaft 54 integrally formed therewith. The stub shaft 54 corresponds to the stub shaft 48 and has an externally threaded outer end portion 55 for the reception of a rotary coupling, such as the rotary coupling 36. The stub shaft 54 is provided with a bore 56 therethrough which opens into the interior of the roll portion 44. It is to be understood that liquid will pass in through the bore 50 and out through the bore 56.

It is to be understood that the several forms of forge rolls illustrated in FIGURE 2 through 6, inclusive, may all be formed of the same materials. That is, each of the forge rolls may be formed from beryllium copper, titanium alloys and nickel based alloys, such as age hardenable nickel and Type K Monel. It will also be understood that each of the forge rolls 27, 38 and 43 will be controlled in temperature by means of a liquid having a temperature in excess of normal room temperature. The temperature of this liquid will vary with the individual forge roll in that the heat transfer properties of the several structures of forge rolls vary. However, it has been found through experimentation that fusion welding aluminum and aluminum alloy sheet material in accordance with the aforedescribed method, the operating surface of each of the forge rolls should be maintained at a temperature ranging from 330° F. to 450° F. at the time of contact with the liquid aluminum, and that the preferred surface temperature range is from 350° F. to 400° F. It is to be understood that the temperature of the temperature-regulating liquid and the volume of liquid required will vary depending upon numerous factors, including the diameter of the forge roll, the width of the forge roll, the rotational speed of the forge roll, the thermal conductivity of the metal of the forge roll, the grain structure of the metal of the forge roll, diameter and position of the internal cooling passages, type of liquid medium flowing through the internal passages, laminar vs. turbulent flow of the liquid medium, and the characteristics of the liquid medium, including specific heat, boiling point, volume of flow per unit time, existence of an interface in the path of heat flow as is shown in FIGURES 3 and 4, for example, and the condition of the work engaging surface of the forge roll. There are, of course, other variables which have not been enumerated.

The forge rolls have been utilized with particular success with aluminum alloys which include 5052 aluminum (aluminum plus 2½% magnesium and ¼% chromium); CB29 aluminum (essentially the same alloy as 5052 aluminum, with 5% of the thickness of each surface consisting of 99% pure aluminum); 3004 aluminum (aluminum plus 1¼% manganese and 1% magnesium); 3003 aluminum (aluminum plus 1¼% manganese); and similar alloys of this general class. When welding the above-listed aluminum alloys, the temperature of the liquid aluminum alloy will be in the vicinity of 1150° to 1350° F.

The above aluminum alloys have been welded at speeds ranging from 100 feet per minute to 400 feet per minute with 99+% reliability. In other words, the jump in reliability from 90% reliability of 99+% reliability can be attributed solely to the specific forge roll arrangement.

So far, nothing has been stated with respect to the inner forge roll 26. As is illustrated in FIGURE 2, the forge roll 26 is provided with stub shafts 54 projecting from opposite sides thereof and journaled in bearings 55 carried by the horn 11. Under operating conditions, the inner forge roll is usually less critical than the outer forge roll. The problems of liquid metal pick-up on the inner forge rolls have been found to be less than those with respect to the outer forge rolls. This can best be attributed to the convex operating surface of the inner forge roll as compared to the concave operating surface of the outer forge roll. However, in all instances, the inner and outer forge rolls have been formed of the same material and the inner forge roll may be controlled as to surface operating temperature in the same manner as is the outer forge roll.

The specified range of operative surface temperatures of the forge roll within which welding can be successfully accomplished has been determined by use of a chromel-alumel thermocouple, made of 24 gauge wire, where the hot junction bead is in a small silver alloy disc about ⅜₁₆ inch diameter by ¹⁄₁₆ inch thickness. This disc is held by spring pressure in rubbing contact with the operative surface of the upper forge roll 27 at a position 70° of arc away on the exit side from the nip position of the inner and outer forge rolls. Thus a surface element of the forge roll will move through nearly 70° of arc after breaking contact with the hot aluminum of the weld before it contacts the temperature measuring element. The time lapse for 70° of rotation will depend on the forge roll diameter and the line speed of welding but for a 1⁵⁄₁₆" roll and at a speed of 300 feet per minute, this time would total .013 second during which heat would flow from the surface inward and also radiate outward, causing some minor cooling of the given element and a lower temperature reading than the maximum. Even though this source of systematic error is not the only error involved in measuring surface temperatures of the forge rolls, it has been found that for a given mode of line operation, the above system comes to an equilibrium value rather quickly, that this equilibrium value is a reproducible number and that the range defined as 330° to 450° F. for welding of aluminum does define the minimum to assure good bonding at the weld and the maximum to eliminate problems of pick-up of aluminum by the forge roll.

Reference is made to FIGURE 1 wherein it will be seen that the horn 11 carries a plurality of tubes. These tubes include a liquid inlet tube 56 and a liquid outlet tube 57 which may be connected to the inner forge roll 26 for the purpose of controlling the temperature of the same. The tubes carried by the horn also include a lacquer inlet tube 58 and a lacquer outlet tube 59 which may be connected to suitable means for coating the interior of the welded tube, these means not being shown. Also, in many instances, it is desired that the interior of the tube in the weld area be provided with an inert gas to reduce oxidation. As a result the horn 11 carries a gas inlet tube 60.

From the foregoing, it will be apparent that by forming forge rolls of metals other than the obvious ferrous metals, such as tool steels, and by providing a temperature-regulating liquid flow through the forge rolls so as to maintain the operative surfaces of the forge rolls at relatively high temperatures, results which have not heretofore been obtainable are possible. Although specific metals have been disclosed and a general range of operating temperatures have been set forth, it is to be understood that minor variations may be made in the invention within the spirit and scope thereof, as defined in the appended claims.

We claim:

1. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of beryllium copper.

2. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of beryllium copper heat treated to a Rockwell hardness of C–20 to C–40.

3. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of a titanium alloy heat treated to a Rockwell hardness of C–20 to C–40.

4. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of a nickel base alloy heat treated to a Rockwell hardness of C–20 to C–40.

5. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of a titanium nickel alloy heat treated to a Rockwell hardness of C–20 to C–40.

6. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of a beryllium nickel alloy heated treated to a Rockwell hardness of C–20 to C–40.

7. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of a non-ferrous alloy heat treated to a Rockwell hardness of C–20 to C–40, and means for retaining the surface temperature of said forge roll within the range of 330° F. to 450° F. whereby metal pick-up is non-existent.

8. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of beryllium copper, and means for retaining the surface temperature of said forge roll within the range of 330° F. to 450° F. whereby metal pick-up is non-existent.

9. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of a beryllium copper heat treated to a Rockwell hardness of C–20 to C–40, and means for retaining the surface temperature of said forge roll within the range of 330° F. to 450° F. whereby metal pick-up is non-existent.

10. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll having at least a rim portion formed of a non-ferrous alloy heat treated to a Rockwell hardness of C–20 to C–40, and means for retaining the surface temperature of said forge roll within the range of 330° F. to 450° F. whereby metal pick-up is non-existent.

11. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, at least a rim portion of said forge roll being formed of beryllium copper heat treated to a Rockwell hardness of C–20 to C–40.

12. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, at least a rim portion of said forge roll being formed of titanium alloy heat treated to a Rockwell hardness of C–20 to C–40.

13. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, at least a rim portion of said forge roll being formed of nickel base alloy heat treated to a Rockwell hardness of C–20 to C–40.

14. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll having a shaft portion, at least said shaft portion being hollow, and means for passing a temperature control liquid through said forge roll to maintain a surface temperature within the range of 330° F. to 450° F. whereby metal pick-up is prevented.

15. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll having a shaft portion, said roll and said shaft portion being hollow, and means for passing a temperature control liquid through said forge roll to maintain a peripheral surface temperature within the range of 330° F. to 450° F. whereby metal pick-up is prevented.

16. A forge roll for use in the fusion welding of lapped edge portions of aluminum and aluminum alloy sheet material wherein the opposed surfaces of the lapped portions of the sheet material are heated to a fusion welding temperature and wherein liquid aluminum is present in contact with the forge roll, said forge roll having a work engaging surface treated to a minimum Rockwell hardness of C-20, said forge roll having a shaft portion, at least said shaft portion being hollow, and means for passing a temperature control liquid through said forge roll to maintain a surface temperature within the range of 330° F. to 450° F. whereby metal pick-up is prevented.

17. In a forge welding apparatus for the continuous welding of aluminum and aluminum alloy sheet material including means for moving two sheet material edge portions into lapped relation, heating means for heating the edge portions to a fusion temperature whereby when the heated edge portions are forged together welding will occur and exposed liquid aluminum will be present, and means for forging together the heated lapped edge portions including a forge roll directly engageable with the liquid aluminum, said forge roll being formed of Type K Monel heat treated to a minimum Rockwell hardness of C-20.

18. A forge roll comprising a first member including a concave workpiece engaging surface and a hollow stub shaft, said first member being hollow and open ended remote from said stub shaft, said stub shaft having a bore, a baffle within said first member closing the inner end of the bore, radial passage communicating said bore with the interior of said first member, a baffle plate carried by said baffle, and a second member closing the open end of said first member, said second member having a hollow stub shaft extending therethrough and opening into said first member whereby a temperature control liquid may be circulated through the forge roll.

References Cited by the Examiner
UNITED STATES PATENTS

| | | | |
|---|---|---|---|
| 1,051,647 | 1/1913 | Taylor | 113—92 |
| 1,152,410 | 9/1915 | Graham | 113—92 |
| 1,434,229 | 10/1922 | Schaeffer | 113—8 |
| 1,801,504 | 4/1931 | Hothersall | 113—8 |
| 1,957,214 | 5/1934 | Horstkotte | 75—153 |
| 1,959,154 | 5/1934 | Bremer | 75—153 |
| 2,161,468 | 6/1939 | Hensel et al. | 75—153 |
| 2,162,308 | 6/1939 | Jenny | 75—153 |
| 2,313,227 | 3/1943 | De Bats | 29—32 |
| 2,645,575 | 7/1953 | Herres | 75—175.5 |
| 2,691,578 | 10/1954 | Herres | 75—175.5 |
| 2,814,855 | 12/1957 | Seary et al. | 29—123 |
| 2,892,704 | 6/1959 | Jaffee et al. | 75—175.5 |
| 2,922,020 | 1/1960 | Andrew | 219—59 |
| 2,984,473 | 5/1961 | Ornitz | 29—132 |
| 3,094,770 | 1/1963 | Williams | 29—123 |
| 3,148,262 | 9/1964 | Hughes | 219—59 |

WHITMORE A. WILTZ, *Primary Examiner.*

MARCUS U. LYONS, *Examiner.*